United States Patent Office 2,965,625
Patented Dec. 20, 1960

2,965,625

PROCESS OF POLYMERIZING A CONJUGATED DIENE

William S. Anderson, Berkeley, and Lee M. Porter, Concord, Calif., assignors to Shell Oil Company, a corporation of Delaware No Drawing. Filed Jan. 27, 1958, Ser. No. 711,157

12 Claims. (Cl. 260—94.3)

This invention relates to the polymerization of conjugated dienes. More particularly it relates to the polymerization of conjugated dienes to produce polymer which is predominately in the transconfiguration.

It is known that conjugated dienes, as butadiene, may be polymerized by various processes to produce polymer which is mainly in the trans-form. The present invention provides a process for producing trans-polymers of conjugated dienes which is efficient, economical and simple to conduct.

It is an object of this invention to produce trans-polymers of conjugated dienes. It is another object of this invention to provide novel processes for the trans-polymerizations of conjugated dienes, which process are conducted simply. Other objects will become apparent as the description of this invention proceeds.

These and other objects are accomplished by the process for polymerizing a conjugated diene comprising contacting a monomeric diene with a catalyst prepared by the reaction of an alkyl lithium and a metal salt selected from chlorides and nitrates of cobalt or nickel or mixtures thereof, the polymerization being conducted in the presence of an ether. It will hereinafter appear that the present polymerizations are conducted at moderate conditions to produce polymer which is principally the trans 1,4-addition product.

As indicated the catalyst is prepared from two components, one of which is an alkyl lithium. Any alkyl lithium may be used but in the preferred embodiment the alkyl radical has from 2 to 8 carbon atoms in a straight chain and more preferred are those having from 4 to 6 carbon atoms in a straight chain. Alkyl lithiums having up to 12 carbon atoms may be used but they are less preferred at present. The preferred alkyl lithiums, such as n-butyl lithium or n-amyl lithiums, are readily available through normal commercial channels. Alkyl lithiums having branching in the alkyl radical may be employed in preparing the catalyst but they are less preferred because they are difficult to prepare in a highly purified form.

The other component of the catalyst is selected from cobalt halide, nickel halide, cobalt nitrate, nickel nitrate and mixtures thereof. In all cases the cobalt and nickel are in the divalent state. In the preferred embodiment the salts are utilized in the purified form free of water of crystallization. Such salts are readily available as the halides of divalent nickel and cobalt and these are the more preferred species. Less preferred are the nitrates of nickel and cobalt. Among the preferred halides which may be employed as the catalyst there may be mentioned cobaltous bromide, cobaltous fluoride, cobaltous iodide, nickelous bromide, nickelous iodide, and nickelous fluoride. Particularly preferred are the bromides and chlorides of cobalt and nickel. If halides or nitrates of cobalt or nickel which contain water of crystallization are to be employed they should be heated at elevated temperatures to drive off the water of crystallization.

The catalyst is simply prepared by mixing the two components together in a hydrocarbon diluent. The hydrocarbon diluent serves merely as a vehicle to more readily effect a reaction between the two catalyst components and accordingly large amounts of the diluent are not necessary. In preparing the catalyst from the two components, it is advantageous to first dissolve the alkyl lithium in the diluent and thereafter add the metal salt to the solution of the alkyl lithium whereupon a suspension of solid reaction product is formed. The quantity of the two components may be varied over a rather wide range. In the preferred embodiment the mole ratio of the metal salt to the alkyl lithium should be from about 1:1 to a mole ratio in which the metal salt exceeds the alkyl lithium. In actual practice, the mole ratio of the metal salt to the alkyl lithium should not exceed about 10:1 as no advantage is obtained thereby. Actually a substantial disadvantage may be incurred in the form of waste of catalyst. More important, however, at such high ratios the polymer will contain considerably higher proportions of catalyst residues which are harmful to the product and require more effort for their separation. In general, the preferred amount of the metal halide to the alkyl lithium ranges from about 1.5:1 to about 5:1 moles.

The hydrocarbon diluent used in preparing the catalyst is an inert diluent such as heptane, octane, isooctane, benzene, toluene, and the like. In the preferred embodiment the lower boiling hydrocarbons are employed as they can be separated more easily from the polymer. The diluent should be pretreated to remove harmful impurities which may be contained therein. Such impurities may appear in the form of unsaturates having active hydrogen, moisture, sulfur, sulfur-containing compounds, oxygen, oxygen-containing compounds and the like. In actual practice it is preferred that such impurities not be present either in the diluent or in the conjugated diene which is to be polymerized. Similar considerations make it advantageous to treat the alkyl lithium to remove harmful impurities.

The actual polymerization of the conjugated diene is preferably conducted in the presence of a linear saturated ether which is normally a liquid. This has the advantage of simplifying the separation of the ether from the product and facilitates handling. In the preferred embodiment the ether has a boiling point from about 30° C. to about 100° C. and includes ethyl ether, n-propyl ethyl, isopropyl ether and the like. Methyl ether may be employed with advantage because of its low boiling point but it is more difficult to handle. Higher boiling ethers, as di-n-butyl ether, di-n-amyl ether, and the like may also be used but they are less preferred because they are more costly and are not separated from the polymer as easily. The same applies to ethers which are normally solids as 2-naphthyl propyl ether, cetyl phenyl ether, benzyl-2-naphthyl ether, and the like. It should be understood, however, that such ethers may be employed in which event a little more effort may be required to separate them from the final product.

The quantity of the ether which is employed may be varied over an unusually wide range as it is found that even small amounts will produce substantial amounts of polymer in the trans-form. For the sake of uniformity it is convenient to express the quantity of ether to be employed in terms of the quantity of the metal salt used in the catalyst composition. In the preferred embodiment the quantity of the ether ranges from about .5 gram to about 300 grams per millimole of the metal salt contained in the catalyst. Most often, however, the ether will range from about 2 to about 150 gms. per millimole of the metal salt. Lesser or greater amounts may be employed and it will be found that as the quantity of the ether is reduced the proportion of the trans-polymer formed is likewise reduced.

It is an outstanding advantage of the present invention that the polymerization of conjugated dienes are conducted under moderate conditions. In the preferred embodiment the polymerization is conducted at temperatures ranging from about 20 to about 30° C. It is most advantageous to conduct the polymerization at room temperatures thereby avoiding the necessity for heating and/or cooling apparatus. The polymerization temperatures may be in the order of 100° C. and even higher. Such temperatures will hasten polymerization rates but have the disadvantage of increasing operating pressures. Considering the operating temperature to be adopted, it is particularly advantageous to avoid operating temperatures in excess of the boiling point of the hydrocarbon diluent when the ether is normally a liquid. In the preferred embodiment the polymerization is conducted in a closed reactor thereby avoiding loss of monomer, solvent and ether if it is a liquid. More important, however, conducting the polymerization in a closed reactor excludes air and atmospheric moisture from the reaction mixture which operates to reduce yields. By conducting the polymerization in a closed reactor some pressure will develop if the polymerization is conducted at higher temperatures. Accordingly, it may be stated that the polymerizations are conducted at "autogenic" pressures which may be defined as the pressure generated by the system at the reaction temperature. Such pressures will vary depending upon the temperature, the nature and quantities of the liquids contained in the reactor and, to some extent, the nature and quantity of the conjugated diene contained within the reactor. It is an outstanding advantage of the present invention that very high pressures are not required and pressures in the order of 500 p.s.i.g., and higher, normally are not required.

The processes of this invention may be applied for the polymerization of any conjugated diene. It is particularly suitable for the polymerization of butadiene and isoprene as these dienes are found to polymerize, according to the present processes, with greater ease and faster rates. Other conjugated dienes will polymerize at suitable rates but they may require somewhat longer reaction times. Among other conjugated dienes which may be polymerized according to the processes of this invention there may be mentioned 2,3-dimethyl butadiene-1,3, 2-ethyl butadiene-1,3, isoprene, 4-methyl hexadiene-1,3, 2-methyl pentadiene-1,3, 2-isopropyl butadiene-1,3, octatriene-2,4,6, 2-amyl butadiene-1,3, piperylene and the like. Not only may any conjugated diene be polymerized but two or more conjugated dienes may be copolymerized to produce useful products. A representative copolymer of this type is, for example, a copolymer of butadiene and isoprene prepared according to the present invention.

After the polymerization is complete, the reaction product is separated from the reactor and treated to separate the hydrocarbon diluent and the ether. If the ether is normally a solid, as indicated above, more effort will be required to separate it and accordingly it is most advantageous to employ ethers which are normally low boiling liquid. The polymer is then treated to remove the catalyst residues which treatment may comprise washing with an acidified lower alcohol such as methanol, ethanol, isopropanol, and the like. The acid which is used to acidify the alcohol is a mineral acid such as sulfuric acid, hydrochloric acid, and the like. Thereafter the polymer may be washed with water and finally treated with a dilute base such as sodium carbonate to neutralize acid residues. The polymer thus obtained comprises principally the trans 1,4-addition product and may also contain lesser amounts of the cis 1,4-addition product and the 1,2-addition product, the latter two being present in substantially lesser amounts.

The polymer compositions which contain the trans-polymer in predominant amounts is useful in the preparation of synthetic rubber compositions or as an extender in natural rubber compositions or compositions which are rubber-like in nature. It will be found, however, that the polymers produced by the present invention are not suitable for the production of rubbers which require great strength, abrasion resistance, and other qualities which are required of rubbers which are used in the manufacture of automobile and truck tires. The present compositions, however, will be found to be useful in rubber compositions used in padding, insulation, athletic equipment, and other applications in industry and commerce.

The processes of the present invention may be conducted in continuous, intermittent or batch operations with the first being preferred as it affords high production per unit of time. In conducting the processes of this invention, various techniques may be adopted to obtain processing advantages. One such technique is the intermittent addition of catalyst during the course of polymerization. Another technique which is found to be particularly useful for the purpose of this invention is the employment of an inert solid support for the catalyst. Such a support should be free of constituents or impurities which adversely effect the reaction. In the preferred embodiment activated carbon is employed because it is found to yield more product in a shorter period of time. In a similar manner, other solid carriers which afford high surface areas are suitable. Representative carriers of this type include alumina, zinc oxide, silica gel, activated montmorillonite clay, activated kaolinite clay, kieselguhr, silicon carbide and the like. Carriers of this latter type should be treated to remove moisture and volatile material which may be occluded in the interstices. A preferred treatment is that of calcining at temperatures in the order of 200-800° C. When a solid carrier of the types described above is employed, it is necessary to treat the product in order to separate the carrier. This may be conveniently accomplished by heating the polymer in a solvent, such as benzene, in order to form a solution of the polymer and thereafter filtering or centrifuging the solution. Another solid carrier which may be employed with advantage comprises preformed polymer of the diene which is to be polymerized. Thus, for example, for the polymerization of butadiene, trans-polybutadiene may be mixed with a catalyst of the type described above and the mixture thus obtained is employed as the catalyst and the carrier. This method of procedure has the advantage that a separate step to isolate the carrier is unnecessary.

The processes of this invention should be conducted while the contents of the reactor are being agitated. This may be accomplished by any conventional means such as an agitator within the reactor or by mounting the reactor on a rocker. Agitation will be found to effect a substantial increase in polymerization rates.

By a combination of the variables described above such as variation of the quantity of the catalyst, the employment of a carrier, and the like, it will be found that different results may be obtained not only in regard to product distribution but also in regard to molecular weight, reaction time, conversion rates and the like.

The invention is described in greater detail in the following examples which are intended as illustration of the present invention.

*Example I*

To a reactor equipped with an agitator is charged 77 millimoles of cobaltous chloride and 5 millimoles of butyl lithium contained in 60 ml. of heptane. The reactor is then sealed and purged with nitrogen. Thereafter 100 ml. of diethyl ether and 10 ml. of butadiene are added to the reactor through an inlet so that they do not come in contact with the atmosphere. The mass is agitated without the application of heat so that the reaction temperature is about 23° C. throughout the reaction. As the polymer forms it remains in solution so that after several hours a viscous solution is obtained. To the polymer solution is then added 300 ml. of methanol acidified with a few drops of hydrochloric acid whereupon a coagulum of polymer is formed. The addition of the alcohol also operates to "kill" the catalyst thereby preventing further polymerization. The contents of the reactor are then filtered and the polymer is then washed with additional alcohol and water and then dried. The resultant polybutadiene has an I.V. of 2.5, measured at 25° C. in toluene. Upon analysis by infrared spectroscopy it is found to contain about 68% of the trans 1,4-, 4% of the cis 1,4- and 28% of the 1,2-addition products.

*Example II*

Several experiments are conducted following the procedure of Example I except that equal parts, by weight, of the following ethers are used, isopropyl ether, methyl butyl ether, propyl ethyl ether and 2-napthyl propyl ether. In each case the work-up procedure is slightly modified to assure that the ether is completely separated from the polymer. The modifications include drying at higher temperatures and/or additional washing to extract the ether. In all cases the polymer obtained is about the same as in Example I.

*Example III*

The procedure of Example I is repeated except that 5 millimoles of cobaltous nitrate replaces the cobaltous chloride. The product obtained has substantially the same I.V. but it contains a higher trans 1,4-content.

*Example IV*

The procedure of Example I is repeated using isoprene instead of butadiene. The polymer has a slightly lower I.V. and about the same distribution of trans, cis and 1,2-addition products.

*Example V*

The procedure of Example I is repeated using 15 millimoles of cobaltous chloride and 5 millimoles of amyl lithium as the catalyst. The diene for this example consists of a mixture of 5 ml. of isoprene and 5 ml. of butadiene and the polymerization is conducted at 80° C. The product ultimately obtained is a copolymer having about 72% trans 1,4-addition products.

From the foregoing it will be seen that this invention is capable of numerous modifications not only in regard to the catalyst components and diene which is to be polymerized but also in regard to operating temperatures and working up procedures. Such modifications, however, may be adopted without departing from the spirit of the invention.

We claim as our invention:

1. The process comprising polymerizing a conjugated diene in the presence of a catalyst of an alkyl lithium and a metal salt selected from the group consisting of cobaltous chloride, cobaltous nitrate, nickelous chloride and nickelous nitrate, the polymerization being conducted in the presence of an ether, the mole ratio of the metal halide to the alkyl lithium ranging from about 1.5:1 to about 5:1, the ether being present in an amount from about 0.5 gram to about 300 grams per millimole of the metal salt and the polymerization temperature ranging from about 20 to about 100° C.

2. The process of claim 1 in which the metal salt is cobaltous chloride.

3. The process of claim 1 in which the melt salt is nickelous chloride.

4. The process of claim 1 in which the metal salt is cobaltous nitrate.

5. The process of claim 1 in which the alkyl lithium is butyl lithium.

6. The process of claim 1 in which the alkyl lithium is amyl lithium.

7. The process comprising polymerizing butadiene in the presence of a lithium butyl-cobaltous chloride catalyst, the polymerization being conducted in the presence of an ether, the mole ratio of the metal halide to the alkyl lithium ranging from about 1.5:1 to about 5:1, the ether being present in an amount from about 0.5 gram to about 300 grams per millimole of the metal salt and the polymerization temperature ranging from about 20 to about 100° C.

8. The process of claim 7 in which the ether is diethyl ether.

9. The process of claim 7 in which the ether is di-n-propyl ether.

10. The process of claim 7 in which the ether is diisopropyl ether.

11. The process of claim 7 in which the ether is methyl butyl ether.

12. The process of claim 7 in which the polymerization is conducted at temperatures ranging from 20–80° C.

References Cited in the file of this patent

UNITED STATES PATENTS

| | | |
|---|---|---|
| 2,692,255 | Kreider | Oct. 19, 1954 |
| 2,772,254 | Gleason et al. | Nov. 27, 1956 |
| 2,781,410 | Ziegler et al. | Feb. 12, 1957 |
| 2,822,357 | Brebner et al. | Feb. 4, 1958 |
| 2,832,759 | Nowlin et al. | Apr. 29, 1958 |
| 2,881,156 | Pilar et al. | Apr. 7, 1959 |
| 2,905,659 | Miller et al. | Sept. 22, 1959 |
| 2,910,461 | Nowlin et al. | Oct. 27, 1959 |

FOREIGN PATENTS

| | | |
|---|---|---|
| 778,639 | Great Britain | July 10, 1957 |
| 785,314 | Great Britain | Oct. 23, 1957 |

OTHER REFERENCES

Fisher: Scientific American, volume 195, No. 5, November 1956, pages 75–84, 86, and 88.